(12) United States Patent
Makhervaks et al.

(10) Patent No.: US 7,543,037 B2
(45) Date of Patent: Jun. 2, 2009

(54) RDMA COMPLETION AND RETRANSMIT SYSTEM AND METHOD

(75) Inventors: Vadim Makhervaks, Yokneam (IL); Giora Biran, Yaakov (IL); Zorik Machulsky, Nabariva (IL)

(73) Assignee: International Business Machines Corporation, Armonk, NY (US)

( * ) Notice: Subject to any disclaimer, the term of this patent is extended or adjusted under 35 U.S.C. 154(b) by 1336 days.

(21) Appl. No.: 10/725,740

(22) Filed: Dec. 2, 2003

(65) Prior Publication Data

US 2005/0120360 A1 Jun. 2, 2005

(51) Int. Cl.
G06F 15/167 (2006.01)
G06F 3/00 (2006.01)
H04L 12/56 (2006.01)
H04L 12/54 (2006.01)

(52) U.S. Cl. .................. 709/212; 709/216; 710/36; 370/412; 370/428

(58) Field of Classification Search ............. 709/212, 709/216; 710/36; 370/412
See application file for complete search history.

(56) References Cited

U.S. PATENT DOCUMENTS

| | | | |
|---|---|---|---|
| 7,281,030 B1 * | 10/2007 | Davis | 709/212 |
| 2003/0097498 A1 | 5/2003 | Sano et al. | |
| 2004/0017819 A1 * | 1/2004 | Kagan et al. | 370/412 |
| 2004/0107304 A1 * | 6/2004 | Grun | 710/36 |
| 2004/0153588 A1 | 8/2004 | Kasper | |
| 2004/0199660 A1 | 10/2004 | Liu | |
| 2004/0249903 A1 | 12/2004 | Ha et al. | |
| 2005/0080952 A1 | 4/2005 | Oner et al. | |

FOREIGN PATENT DOCUMENTS

WO WO/9935793 7/1999

OTHER PUBLICATIONS

European Patent Office Communication Pursuant to Article 96(2) EPC, Sep. 11, 2007, 6 pages.

\* cited by examiner

*Primary Examiner*—Tonia L Dollinger
*Assistant Examiner*—Anish Sikri
(74) *Attorney, Agent, or Firm*—Joseph Petrokaitis; Hoffman Warnick LLC

(57) ABSTRACT

A system and method for maintaining ordering in completion and retransmit operations in an RDMA environment. A system is provided for handling a completion process in an remote data memory access (RDMA) environment having a RequestOut channel and a ResponseOut channel, comprising: a descriptor list for each channel, wherein each descriptor list includes a message descriptor for each message in the channel; an update mechanism for updating a message length field in the message descriptor with a sequence number of a last byte in the message whenever a channel swap occurs between the RequestOut channel and the ResponseOut channel; an acknowledgement (Ack) completion system that examines values in a completion context and compares a sequence number of a next to complete message with a last acknowledged sequence number to determine if the message should be completed; and a read request completion system that performs completion of a read request.

7 Claims, 9 Drawing Sheets

TRANSMIT MESSAGE DESCRIPTOR FORMAT

| DOUBLE WORD | BYTE 0 | | | | | | | | BYTE 1 | | | | | | | | BYTE 2 | | | | | | | | BYTE 3 | | | | | | | |
|---|---|---|---|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
| 0 | CODE | | | | | | | | CONTROL | | | | | | | | DescriptorCount | | | | | | | | WBStatus | | | | | | | SN/MsgLengthBit |
| | MESSAGE LENGTH / SEQUENCE NUMBER | | | | | | | | | | | | | | | | | | | | | | | | | | | | | | | |
| 1 | WORK REQUEST ID | | | | | | | | | | | | | | | | | | | | | | | | | | | | | | | |

*FIG. 2*

* #x - INDICATES THE ORDER IN WHICH MESSAGES WERE TRANSMITTED
* sn=xx - INDICATES A SEQUENCE NUMBER OF THE LAST BYTE OF THE MESSAGE, WRITTEN BACK TO THE MESSAGE
* IN THIS EXAMPLE, EACH MESSAGE CONSUMES 100 BYTES OF TCP STREAM, THE INITIAL SN IS ZERO.

RDMA COMPLETION AND RETRANSMIT SYSTEM AND METHOD

BACKGROUND OF THE INVENTION

1. Technical Field

The present invention relates generally to remote data memory access (RDMA) completion and retransmit systems, and more particularly relates to an implementation of RDMA completion and retransmit that maintains ordering between the ResponseOut and RequestOut channels.

2. Related Art

RDMA (remote data memory access) is a network interface card (NIC) feature that lets one computer directly place information into the memory of another computer. The technology reduces latency by minimizing demands on bandwidth and processing overhead. Traditional hardware and software architecture imposes a significant load on a server's CPU and memory because data must be copied between the kernel and application. Memory bottlenecks become more severe as connection speeds exceed the processing power and memory bandwidth of servers.

RDMA gets around this by implementing a reliable transport protocol in hardware on the RNIC (RDMA network interface card) and by supporting zero-copy networking with kernel bypass. Zero-copy networking lets the RNIC transfer data directly to or from application memory, eliminating the need to copy data between application memory and the kernel.

Kernel bypass lets applications issue commands to the RNIC without having to execute a kernel call. The RDMA request is issued from user space to the local RNIC and over the network to the remote RNIC without requiring any kernel involvement. This reduces the number of context switches between kernel space and user space while handling network traffic.

RDMA consumers (applications) uses message semantics to communicate. The data is posted for transmit in messages, received in messages and completion is expected to be reported in units of messages. TCP in its turn is a byte-stream oriented protocol, which is not aware of possible message boundaries of ULP data. Therefore, the task of translation of message-to-byte stream semantics falls on RDMA, and their offloaded implementation.

RDMA is a message-oriented ULP that uses TCP reliability services. RDMA adds another level of complexity to the mapping of message-oriented ULP to the byte-oriented TCP semantics. RDMA uses the same TCP connection to transmit messages posted by two independent sources:

RequestOut—RDMA requests originated by local consumer; and
ResponseOut—RDMA responses originated by RNIC, as a result of reception and processing of inbound RDMA Read Request sent by remote consumer.

RNIC interleaves RequestOut and ResponseOut messages when transmitting them through the same TCP connection. In addition to the byte-stream to the message-stream mapping, RNIC needs to preserve "transmit ordering" between messages from RequestOut and ResponseOut, during completion and retransmit processes.

Different RDMA requests (e.g., "Fence") and completion ordering rules (e.g., RDMA Read Request is completed when RNIC receives an RDMA Read Response) may suspend a transmit or completion process in RequestOut. This suspension however does not prevent ResponseOut from performing transmit and completion of RDMA Read Responses. Accordingly, in order to preserve independence between the RDMA request queue and RDMA response queue, a system is required to efficiently preserve order between the two queues.

One approach to resolve this issue would be to build a single request/response channel implemented, e.g., using a control structure (descriptors) and/or by maintaining a separate copy of the data. Such an approach has several disadvantages, including:

Additional copy operations are required;
More RNIC resources are needed to implement such an approach (the data/control is copied to the adapter memory);
Lack of flexibility (adapter memory is a limited resource, which limits the number of RDMA messages that can be outstanding on the wire); and
Enforcing completion ordering between RDMA Requests and RDMA Responses is more difficult.

Accordingly, a solution is required to address the above-mentioned problems.

SUMMARY OF THE INVENTION

The present invention addresses the above-mentioned problems, as well as others, by providing an efficient solution for the completion and retransmit of RDMA streams, without the need for an additional copy of data or of control structures to maintain ordering. In a first aspect, the invention provides a process for handling a completion request in an remote data memory access (RDMA) environment having a RequestOut channel and a ResponseOut channel, comprising: a descriptor list for each channel, wherein each descriptor list includes a message descriptor for each message in the channel; an update mechanism for updating a message length field in the message descriptor with a sequence number of a last byte in the message whenever a channel swap occurs between the RequestOut channel and the ResponseOut channel; an acknowledgement (Ack) completion system that examines values in a completion context and compares a sequence number of a next to complete message with a last acknowledged sequence number to determine if the message should be completed; and a read request completion system that performs completion of a read request.

In a second aspect, the invention provides a method for handling a completion process in a remote data memory access (RDMA) environment having a RequestOut channel and a ResponseOut channel, including performing an acknowledgement completion on each channel with the steps of: concluding that the processing of the completion process is finished if the sequence number of a next to complete message is invalid; concluding that the processing of the completion process is finished if the sequence number of the next to complete message is greater than the last acknowledged sequence number; and completing the message in the channel if the sequence number of the next to complete message is less than or equal to the last acknowledged sequence number.

In a third aspect, the invention provides a method for locating a segment to retransmit for a retransmit request in a remote data memory access (RDMA) environment having a RequestOut channel and a ResponseOut channel, comprising: identifying a candidate message for both the RequestOut channel and the ResponseOut channel; selecting a message carrying the segment to transmit from the two candidate messages; and determining a location of a pointer descriptor that refers to a beginning of the segment to retransmit.

In a fourth aspect, the invention provides a system for handling a transmit process in a remote data memory access (RDMA) environment having a RequestOut channel and a ResponseOut channel, comprising: a descriptor list for each channel, wherein each descriptor list includes a message descriptor for each message in the channel; and an update mechanism for updating a message length field in the message descriptor with a sequence number of a last byte in the message whenever a channel swap occurs between the RequestOut channel and the ResponseOut channel.

BRIEF DESCRIPTION OF THE DRAWINGS

These and other features of this invention will be more readily understood from the following detailed description of the various aspects of the invention taken in conjunction with the accompanying drawings in which:

FIG. 2 depicts a message descriptor in accordance with the present invention.

DETAILED DESCRIPTION OF THE INVENTION

Figure 1:
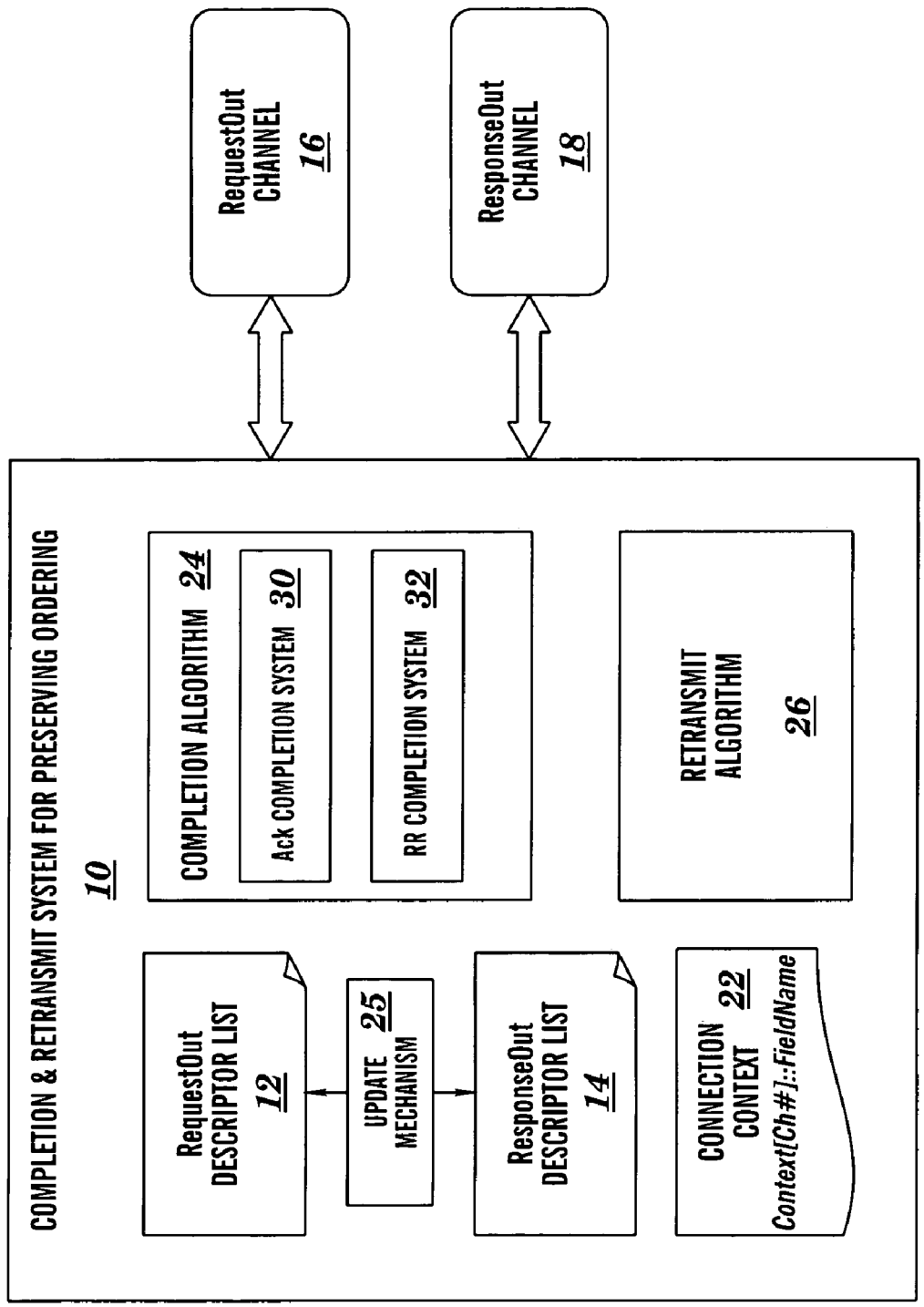
FIG. 1 depicts a completion and transmit system for maintaining ordering in accordance with the present invention.

Described below is a system and method for implementing RDMA completion and retransmit. Within the RDMA protocol, "completion" is defined as the process of informing the ULP (upper layer protocol) that a particular RDMA operation has performed all functions specified for the RDMA operations, including placement and delivery. The completion semantic of each RDMA operation is distinctly defined. "Retransmit" is defined as the process of retransmitting data across a channel.

As described below, the present invention utilizes a double-channel implementation (i.e., one for ResponseOut and one for RequestOut). To effectuate such an implementation, the invention provides a methodology for preserving ordering between the two channels whenever completion or retransmit operations are required.

It is assumed for the purpose of this description that the reader has an understanding of the RDMA protocol and its implementation in an RNIC environment. The RDMA protocol is available on the Web at <www.rdmaconsortium.org/home>.

Background—RDMA Protocol Ordering Rules

RDMA protocol defines completion ordering rules for the messages transmitted via the RequestOut channel. These rules are outlined as follows:

All RDMA requests must be completed in order they have been posted by a consumer. RDMA has three types of requests:

(1) RDMA operations consisting of a single RDMA message (e.g., Send, Write). These operations are intended to transfer the data from a local to remote host, and consist of single RDMA message sent from the remote to the local host. Send and Write operations are considered completed when RNIC can guarantee that all TCP segments comprising those messages would be reliably transmitted to other end point of the TCP connection.

(2) RDMA operations consisting of several (generally two) RDMA messages, e.g., Read. These operations are intended to read the data from the remote memory. Such operations consist of two RDMA messages: Read Request and Read Response. Read Request is a message that is sent by a request originator to the data source. This message carries all the information necessary to read the data from the remote memory, and build a response message. The response message, generated by the remote host, is a Read Response. This message carries the data that should be written to the requester memory, and also includes a description of the location to which the data should be written. Read operations are considered completed when the RDMA Read Response message has been successfully received by the Read initiator. An RDMA Read Response is not a separate RDMA operation (i.e., it is part of the Read operation), and therefore the message is considered to be completed when the transport layer has successfully transmitted it.

(3) Local RDMA operations (e.g., Bind, Fast-Register, etc.). These operations do not result in the transmitting of any data (i.e., TCP segment). Local RDMA operations are considered as completed when their processing is finished by RNIC.

Overview

Referring to FIG. 1, a completion and retransmit system 10 for preserving ordering between the ResponseOut and RequestOut channels is shown. The ordering is maintained when either a "request for completion" or "request for retransmit" is issued using either a completion algorithm 24 or a retransmit algorithm 26. To facilitate the process, system 10:

(1) Provides separate descriptor lists 12, 14 for the RequestOut and ResponseOut channels 16, 18; and (2) Performs transmit, completion and retransmit operations using information from those descriptor lists.

In this approach, each work queue entry (WQE) is processed (i.e., read) twice, first when transmitting the WQE, and second when completing the WQE. (Note that a retransmit operation would require an additional read of retransmitted WQEs).

RNIC keeps information for each RDMA connection needed to maintain the connection. This information is kept in a connection context 22, and in this embodiment, a set of connection context fields are used to facilitate implementation of the completion 24 and retransmit 26 algorithms. In an exemplary embodiment, context fields are indicated by Context[Ch#]::FieldName. The following context fields are relevant to the present invention:

1. Context[Ch#]::PendingCompletionRequest—bit used to signify that RNIC has a pending Ack or RDMA Read completion request to handle.

2. Context[Ch#]::CompletedReadRequestsNum—used to signify the number of completed read requests.

3. Context[Ch#]::ReqOutLastCompletedMsgSN—used to signify a sequence number (SN) of the last completed message in a request out channel.

4. Context[Ch#]::ReqOutNextToCompleteMsgSN—used to signify a sequence number (SN) of the next to complete message in a request out channel.

5. Context[Ch#]::RespOutLastCompletedMsgSN—used to signify a sequence number (SN) of the last completed message in a response out channel.

6. Context[Ch#]::RespOutNextToCompleteMsgSN—used to signify a sequence number (SN) of the next to complete message in a response out channel.

7. Context[Ch#]::LastAckedSN—sequence number of the last received ACK.

8. Context[Ch#]::PendingReadRequest—this bit indicates that while performing a completion operation, RNIC stopped on the RDMA Read Request, and must wait for reception and delivery of the RDMA Read Response by receive logic to complete this Read Request, and then proceed to the completion of any following RDMA Requests 9. Context[Ch#]::PendingReadRequestsCount—value used to signify the number of transmitted and not-completed RDMA Read Requests.

10. Context[Ch#]::PendingReadRequestCompletion—needs to use PendingReadRequest bit.

11. Context[Ch#]::TotalPostedMsgCount—signifies a number of posted and not transmitted messages.

12. Context[Ch#]::TotalPendingMsgCount—signifies a number of transmitted messages waiting for completion per connection.

To represent an RDMA message in a descriptor list, several descriptor types are used. One of them is a Message Descriptor, such as that shown in FIG. 2. This descriptor starts each RDMA message, and carries message description and information about other descriptors used to represent the message. The following fields are relevant to the invention:

1. MessageDescriptor::MessageLength—used to carry either the message length or the Sequence Number.

2. MessageDescriptor::SN/MsgLengthBit—used to describe the contents of the MessageDescriptor::MessageLength field.

Completion Algorithm

The completion algorithm 24 in accordance with the present invention has two completion triggers:

(1) Reception of a TCP Acknowledge (Ack). This indicates that the transmitted data has been successfully received on another end point of a connection, and the RDMA operations (Sends, Writes) covered by this Ack are completed. The RDMA Read Response message, as a part of the Read operation, is completed when the Ack covering this message has been received.

(2) Reception and delivery of an RDMA Read Response. This indicates that a corresponding RDMA Read Request (or pending Read operation) is completed.

Pending completion request indications are held in connection context 22 including Context[Ch#]::PendingCompletionRequest (which signifies that RNIC needs to perform a completion operation; this is actually means that the Receive Logic received either the new TCP Ack, or received and delivered the RDMA Read Response, and Completion logic should figure out what operation has been completed, if any, and report completion of those operations to the consumer) and Context[Ch#]::CompletedReadRequestsNum (which contains the number of completed read requests). This field holds the number of received and delivered by Receive Logic RDMA Read Response Messages. This effectively means that Completion Logic can complete that many pending RDMA Read Messages posted by consumer. From the RNIC perspective, Completion Logic completed that many RDMA Read Requests, and still needs to report that completion to the consumer.

Figure 3:
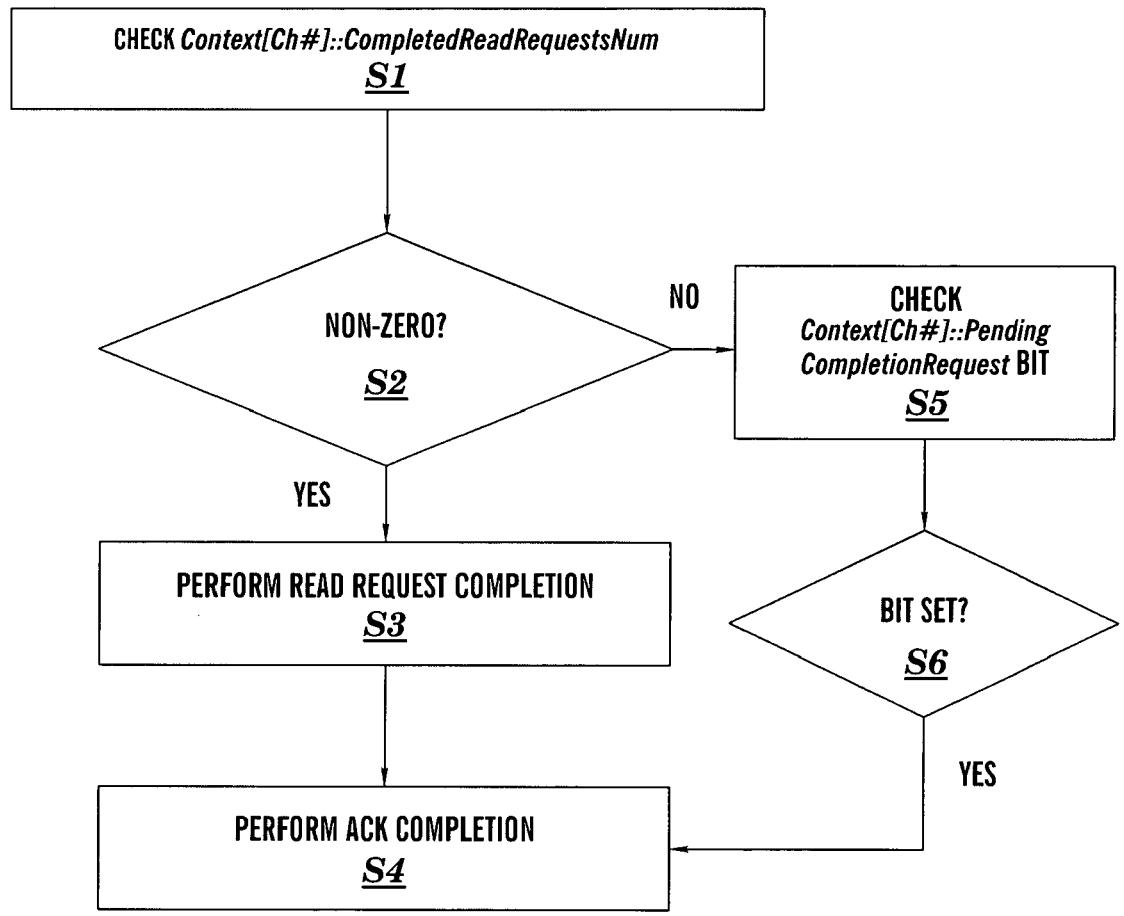
FIG. 3 depicts a flow diagram of a completion algorithm in accordance with the present invention.

The overall methodology for handing these cases is shown in FIG. 3. First, at step S1, Context[Ch#]::CompletedReadRequestsNum is checked. If the value is non-zero (step S2), this indicates that the connection has a pending Read Request completion. In this case, RNIC first performs a "read request completion" operation described below, and then performs an "Ack completion" (steps S3 & S4), as also described below, regardless of the Context[Ch#]::PendingCompletionRequest bit. If the Context[Ch#]::CompletedReadRequestsNum equals zero and the Context[Ch#]::PendingCompletionRequest bit is set (step S5), RNIC performs the Ack completion (step S4), as also described below.

Ack Completion

A received TCP Ack completes an RDMA request posted to the RequestOut and ResponseOut channels 16, 18. The major challenge of completion process is to follow the order in which messages from ResponseOut and RequestOut channels were transmitted. To preserve this order, RNIC updates the Message Descriptors using update mechanism 25 of selected messages to carry the Sequence Number (SN) of the last byte of the message. This update process, also referred to as a "write-back," is performed when RNIC transmits a last segment of the message. RNIC uses the MessageDescriptor::MessageLength field to carry either the message length or the Sequence Number. The MessageDescriptor::SN/MsgLengthBit describes the content of the MessageDescriptor::MessageLength field.

RNIC does not update all messages, but only those used after a channel has been swapped, i.e., only the first message is updated after swapping the channel. When transmitting RDMA messages, RNIC interleaves RequestOut and ResponseOut messages. RNIC arbitrates between the ResponseOut and RequestOut channels, and selects one of the channels to transmit the next message. Channels are not swapped in the middle of a transmitted message. When a swap occurs between channels, update mechanism 25 updates the message descriptor with the SN of the next message in the channel after the channel swap. After a swap, the message descriptor is updated only for the first message in the new channel, and the associated SN is updated to the SN of the last transmitted byte of that message. As shown in FIG. 2, the information kept in the MessageLength field (either MessageLength or SequenceNumber) is then used during completion and retransmit process.

Figure 4:
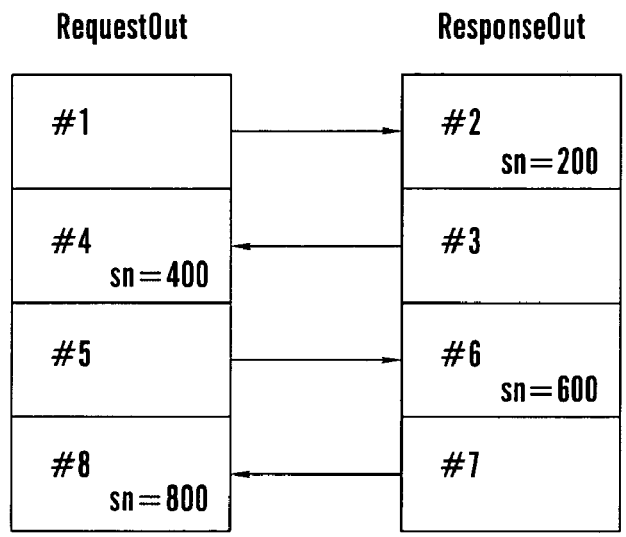
FIG. 4 depicts an example of updating the sequence numbers in RequestOut and ResponseOut channels in accordance with the present invention.

An example of the updating process is shown in FIG. 4. In this example, RNIC swaps channels four times. It starts with message #1 in the RequestOut channel, then swaps to the ResponseOut channel (message #2), and updates this message with the SN of the last byte of this message #2. After message #3, RNIC swaps to the RequestOut channel for message #4, which it updates. After message #5, RNIC swaps to the ResponseOut channel for message #6, which it updates. After message #7, RNIC swaps to the RequestOut channel for message #8, which it updates.

A write-back operation is performed only for connections utilizing both channels. If a connection uses only one channel, no write-back operation is performed.

RNIC holds several sequence numbers in connection context 22 for each channel: Context[Ch #]::ReqOutLastCompletedMsgSN, Context[Ch#]::ReqOutNextToCompleteMsgSN, Context[Ch#]::RespOutLastCompletedMsgSN, and Context[Ch#]::RespOutNextToCompleteMsgSN, which carry a sequence number (SN) of the last completed and first not completed message in each channel, respectively. They are initialized to carry an initial connection sequence number, and are updated during completion operations.

Ack Completion Flow

Completion flow is implemented by RNIC looping through a series of steps separately for both the RequestOut and ResponseOut channels. This process is described below. Note that the sequence number of the last received ACK is indicated in Context[Ch#]::LastAckedSN.

Figure 5:
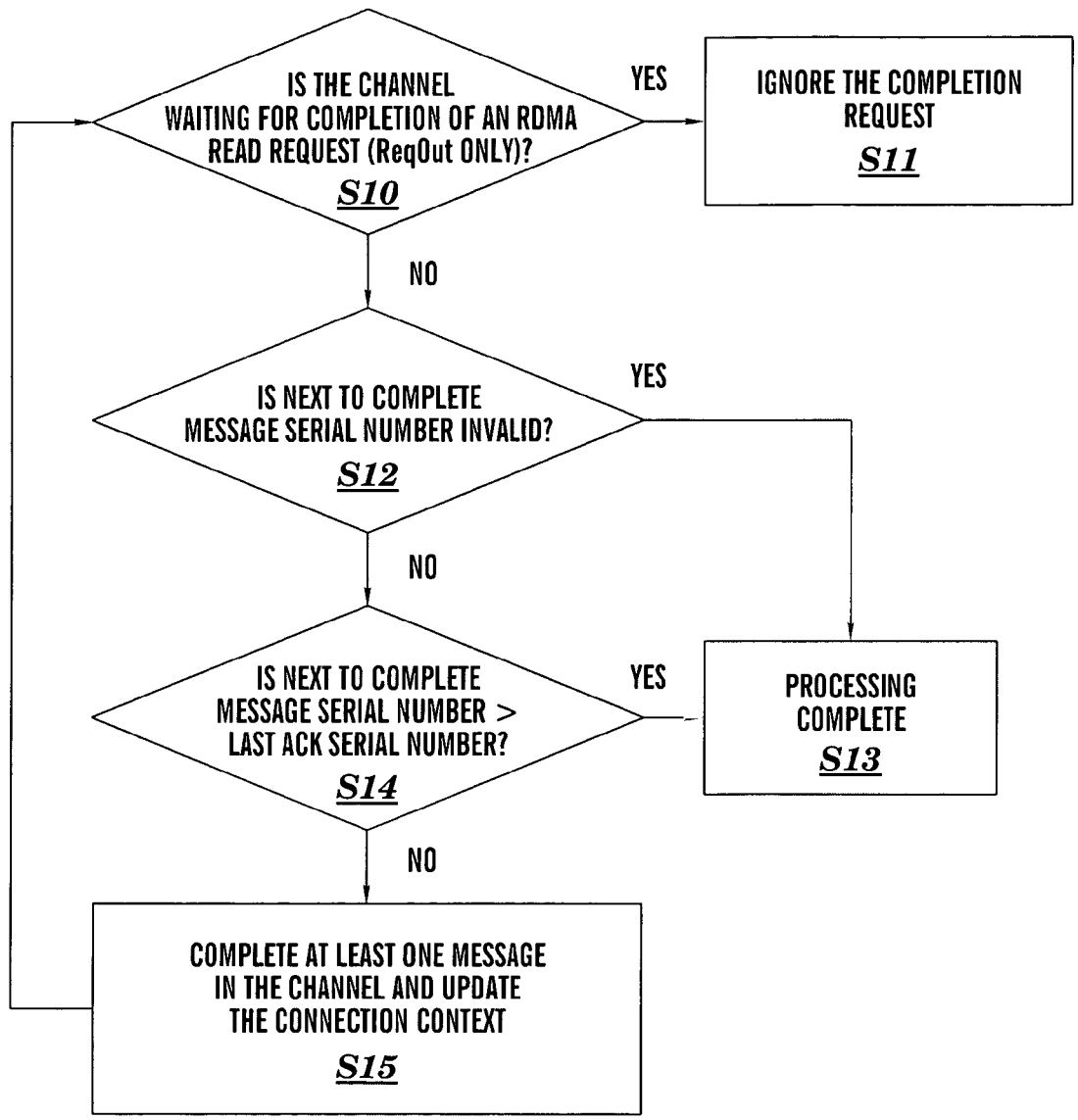
FIG. 5 depicts a flow chart showing an Ack completion operation.

The steps are outlined as follows with reference to the flow diagram of FIG. 5.

Step 1 (S10): If the channel is waiting for completion of an RDMA Read Request (i.e., Context[Ch#]::PendingReadRequest is set), then RNIC ignores the completion request (S11). Note that this rule is not relevant for ResponseOut channel since the ResponseOut channel carries RDMA Read Responses only.

Step 2 (S12): If Context[Ch#]::NextToCompleteMsgSN is invalid, the processing of the completion request for this channel is finished (S13). This occurs when either no more messages have been posted, or a next posted message was not entirely transmitted.

Step 3 (S14): If Context[Ch#]::NextToCompleteMsgSN>Context[Ch#]::LastAckedSN, then the received completion request does not complete any message in that channel, and processing of the completion request for this channel is finished (S13).

Step 4 (S15): Otherwise, the completion request completes at least one message in that channel and RNIC updates the connection context as follows:

Context[Ch#]::LastCompletedMsgSN is updated with Context[Ch#]::NextToCompleteMsgSN; and Context[Ch#]::NextToCompleteMsgSN is updated with the last SN of the next message in the channel. The last SN of the next message can be retrieved in one of following ways:

(1) Explicitly in the MessageDescriptor::MessageLengh/SN field, when the MessageDescriptor::SN/MsgLengthBit indicates that this field carries the Sequence Number;

(2) Implicitly, using the MessageDescriptor::MessageLength as a size of Application payload, and adding the protocol headers, footers and control information (DDP headers, markers, padding, CRC); and (3) Invalid—when the channel does not have the next transmitted message. This includes the case when no messages were posted, and the case when the message has been posted, but not entirely transmitted.

Note that if a completed message is not an RDMA Read Request, then RNIC performs completion of the RDMA operation, the details of which are not relevant to the subject of this invention.

In the case of an RDMA Read Request, RNIC waits for the RDMA Read Response to perform completion, and sets the Context[Ch#]::PendingReadRequest bit.

Step 5: Go back to the step 1.

RDMA Read Request Completion

RNIC completes posted RDMA requests upon receiving a TCP Ack covering the request. An RDMA Read Request is an exceptional case that is completed when the corresponding RDMA Read Response has been received.

Figure 6:
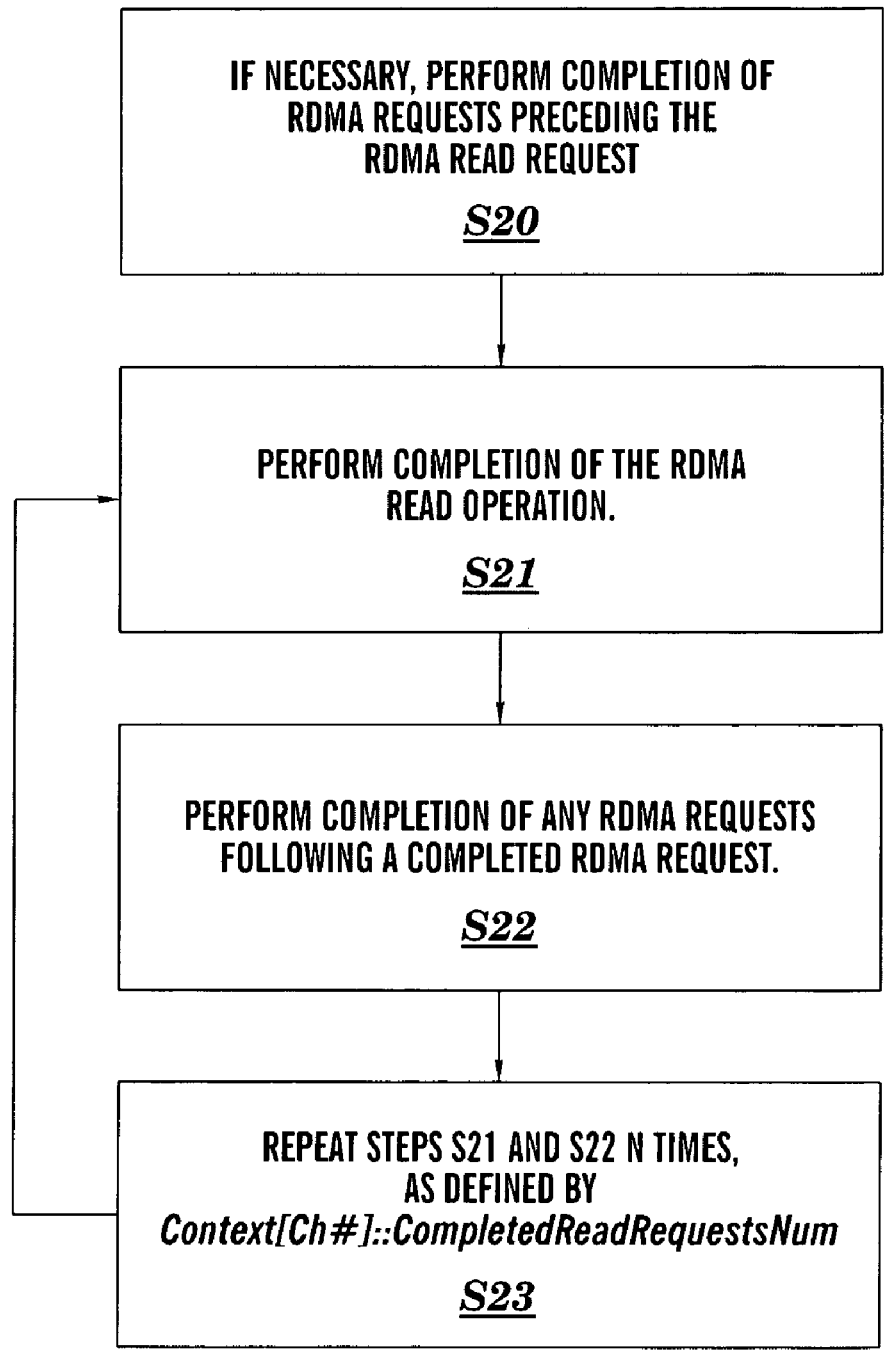
FIG. 6 depicts a flow chart showing an RDMA read request completion operation.

RDMA ordering rules require RDMA requests to be completed in the order they have been sent. This means that RNIC needs to wait for reception of the RDMA Read Response before completing RDMA requests following an RDMA Read Request. Processing of a received RDMA Read Response is shown in a flow chart in FIG. 6, and involves the following steps:

Step 1 (S20): If necessary, perform completion of RDMA Requests preceding the RDMA Read Request.

This is a very rare case, and occurs when completion requests have not been processed until reception of RDMA Read Response. Thus, RNIC needs first to complete all requests preceding the RDMA Read Request. This case is indicated by non-zero Context[Ch#]::PendingReadRequestsCount and clear Context[Ch#]::PendingReadRequest bit.

Step 2 (S21): Perform Completion of the RDMA Read Request itself.

RNIC performs completion of the RDMA Read operation; the details of are not relevant to the invention.

Step 3 (S22): Perform completion of any RDMA requests following a completed RDMA Read Request.

This process is described above under the section "Ack Completion."

Step 4 (S23): Repeat steps 2-3 N number of times, wherein N is the number of completed RDMA Read Requests defined by Context[Ch#]::CompletedReadRequestsNum.

Figure 7:
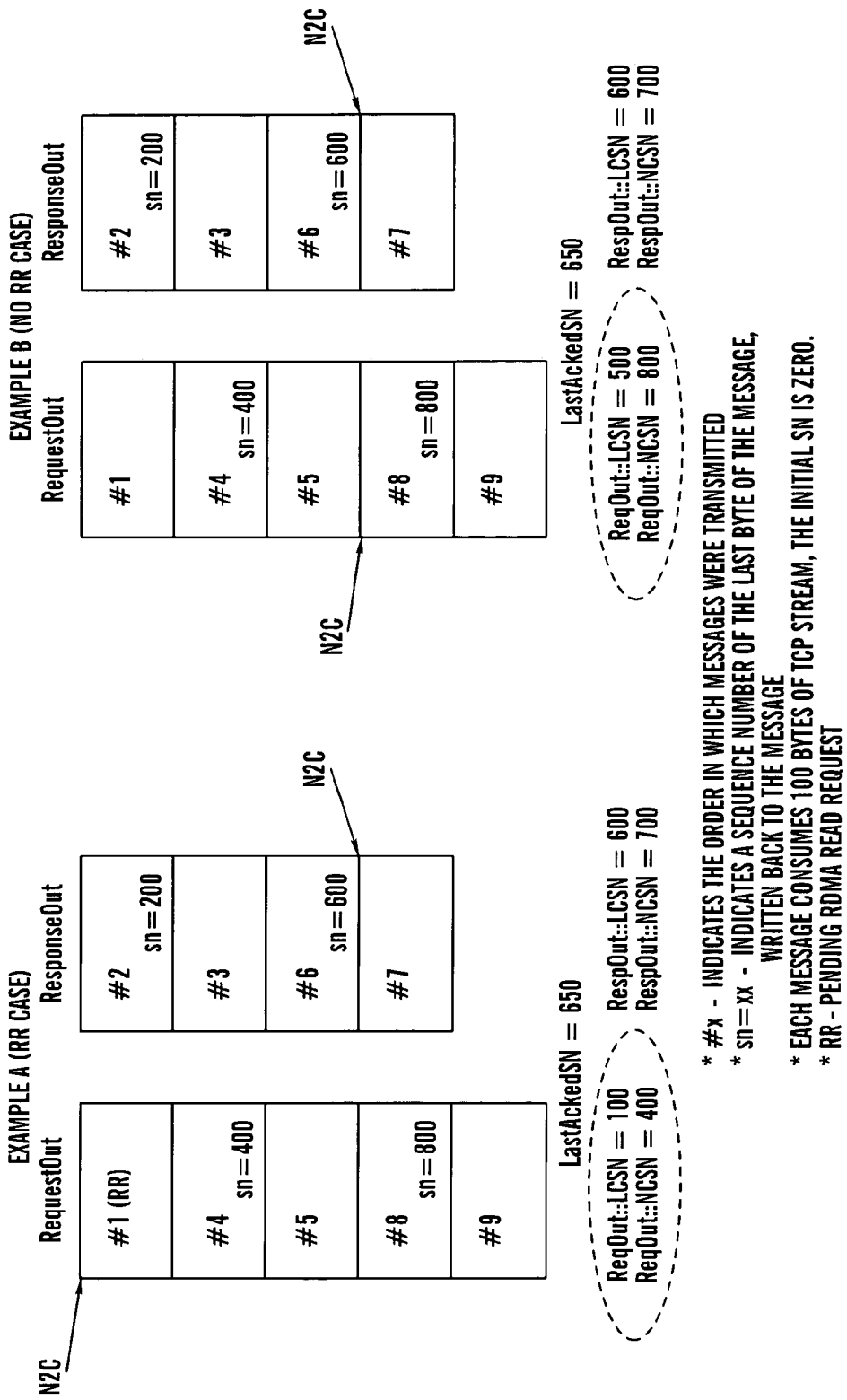
FIG. 7 depicts a pair of examples for maintaining completion ordering in a RequestOut and ResponseOut channel in accordance with the present invention.

An example of these processes is also depicted in FIG. 7.

Retransmit Request Flow

Processing of a retransmit request involves addressing the following issues:

Issue 1: RNIC needs to process all pending completion requests for this connection. Therefore, if a connection has an outstanding completion request, then the RNIC is requested to process this request. Processing of the retransmit request is resumed only after completion processing for the connection has been finished.

Issue 2: Retransmit can be requested either due to a fast-retransmit mechanism, or due to a timeout. Retransmit due to a timeout involves the retransmission of all transmitted, but not completed, TCP segments. Retransmit due to a fast-retransmit mechanism involves retransmission of the first not completed TCP segment only. RNIC uses different retransmit request types. Processing of the retransmit request depends on the request type, which are described below.

Issue 3: One of crucial parts of retransmit request processing is the location of the segment to retransmit in the RequestOut or ResponseOut descriptor lists. This process is described below.

Retransmit does not necessarily preserve boundaries of transmitted segments. The location from which retransmit should be started is indicated by LastAckedSN. Socket and iSCSI are not sensitive to changes of the transmitted segment boundaries. iSCSI assumes that TCP does not submit requests to perform retransmit for the not-transmitted data. This allows iSCSI Data Processing logic to assume that during retransmit, all inbound Immediate Command descriptors carry a valid iSCSI CRC, calculated during transmit.

RDMA preserves boundaries of transmitted DDP segments, and thus may start retransmit from a location other than LastAckedSN.

Retransmit Request Types

Figure 8:
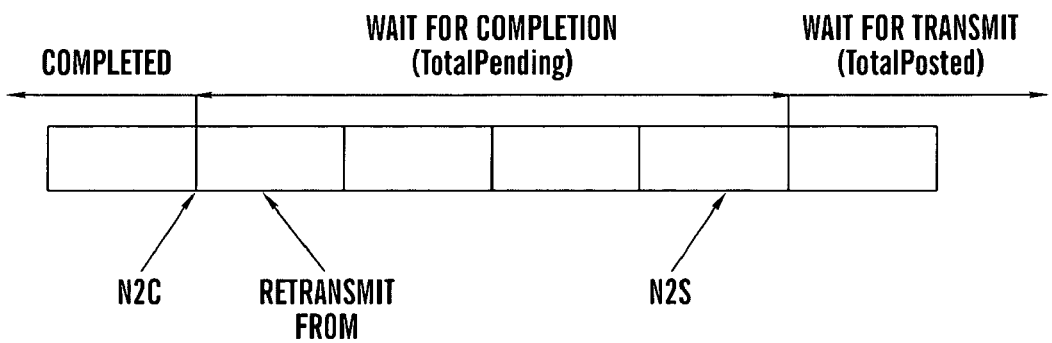
FIG. 8 depicts three retransmit cases in accordance with the present invention.
Figure 8:
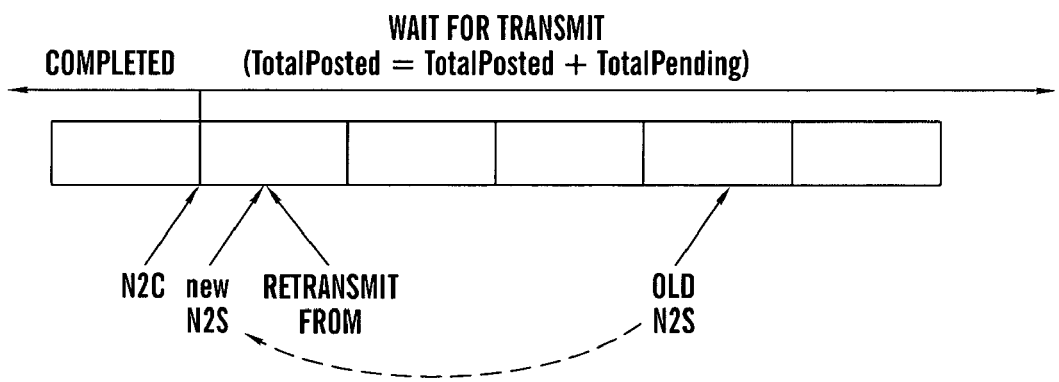
Figure 8:
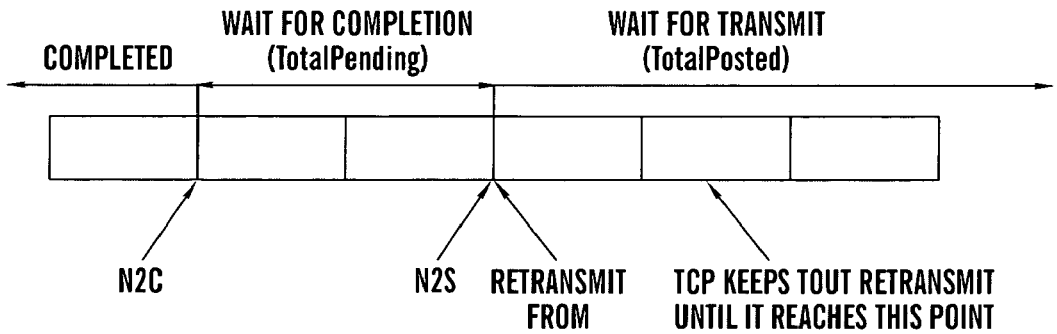

As shown in FIG. 8, TCP posts three types of retransmit requests:

(1) Retransmit due to fast-retransmit;
(2) Start retransmit due to timeout; and
(3) Proceed timeout retransmit.

All types of retransmit requests involve retransmission of a single TCP segment. RNIC keeps boundaries of completed, waiting for completion, and waiting for transmit messages, using NextToCompletion and NextToSend pointers, per RequestOut and ResponseOut channels. RNIC also keeps a number of posted and not transmitted messages (Context [Ch#]::TotalPostedMsgCount), and a number of transmitted messages waiting for completion (Context[Ch#]::TotalPendingMsgCount) per connection. Note that both Context[Ch#]::TotalPostedMsgCount and Context[Ch#]::TotalPendingMsgCount are kept for each connection, and are used for both ResponseOut and RequestOut channels. In case of fast-retransmit, RNIC just retransmits the first not completed segment (i.e., the TCP segment inside message referred by NextToComplete), without updating any of the pointers or counter mentioned above. The channel to retransmit from is selected as described below.

In the case of start retransmit due to timeout, RNIC updates the NextToSend pointer of one or both channels to refer to the first not completed TCP segment in that channel, inside message referred by NextToComplete (N2C), and retransmits a single TCP segment from this location. The Context[Ch#]::TotalPostedMsgCount and Contrext[Ch#]:: TotalPendingMsgCount are updated respectively. The NextToSend (N2S) channel pointer is advanced to refer to the next segment to be retransmitted (or transmitted) in that channel. In case of a proceed timeout retransmit, RNIC retransmits a single TCP segment from the location referred by NextToSend, and updates NextToSend and Context[Ch#]::TotalPendingMsgCount respectively. Note that TCP does not request retransmission of TCP data that has not been transmitted.

Locating of Segment to Retransmit

The location of the TCP segment to retransmit is affected by having two channels, RequestOut and ResponseOut, holding transmitted messages. The location of the segment to retransmit consists of several steps, outlined below:

Step 1: Finding a first not-completed message in the RequestOut channel.

After this step, each channel (RequestOut and ResponseOut) has a candidate message. This step is relevant only when a channel waits for completion of a pending RDMA Read Request (i.e., Context[Ch#]::PendingReadRequest bit set), and therefore is only relevant for the RequestOut channel.

Figure 9:
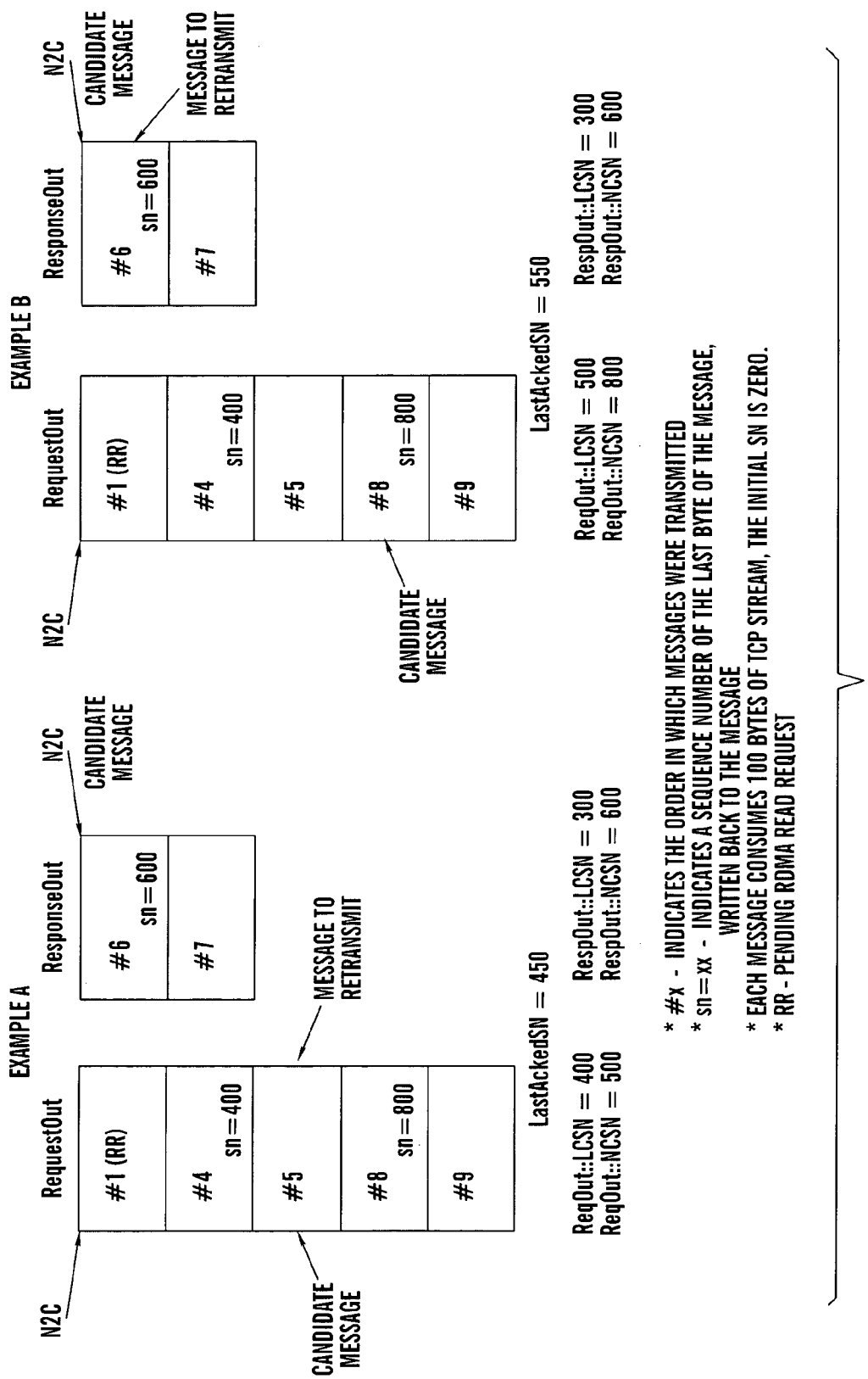
FIG. 9 depicts a pair of examples for maintaining retransmit ordering in a RequestOut and ResponseOut channel in accordance with the present invention.

This involves a process very similar to the regular completion walk-through of the channel messages process described above, in the discussion of calculation options under the section entitled "Completion Flow." The goal of this process is to find a message having a last sequence number that exceeds a Context[Ch#]::LastAckedSN. This message potentially carries a segment to retransmit. As shown in FIG. 9, this is message #5 in Example A, and is message #8 in Example B. The walk through process involves calculation of the last sequence number of the message. Note an important difference of this walk through for the RequestOut descriptors versus the walk through described for the regular completion operation due to reception of a TCP Ack as described above. The difference is that in a walk through due to retransmit, RNIC ignores RDMA ordering rules, and treats an RDMA Read Request as a uni-directional RDMA operation (like Send or RDMA Write). This is done since the goal is to get to the first RDMA message that was not successfully transmitted by TCP.

In the example described above in FIG. 9 for the case of a completion due to reception of RDMA Read Response, the regular completion handling process would end with ReqOut::NCSN=100, ReqOut::LCSN=0, RespOut:: NCSN=600, RespOut::LCSN=300 for both examples. (Note that RespOut already points to the candidate WQE). In the ReqOut channel for both examples, the completion process would stop on the first pending RDMA Read Request (which is the first WQE# in these examples). The difference between the two examples is that an AckSN of the last received Ack would be 450 for Example A, and 550 for Example B. This is the initial condition for the retransmit operation. The retransmit operation starts with the walk though in the ReqOut channel. In Example A, RNIC walks through WQE#1 and WQE#4, and reaches WQE#5, which ends with a larger SN (500) than LastAckedSN (450). In Example B, the walk through stops at WQE#8. The NCSN and LCSN are then updated respectively for each example.

Note that the walk-through process is relevant to a RequestOut channel having a pending RDMA Read Request. Otherwise, in the case of no Read Request, or a ResponseOut channel, the next-to-complete (N2C) always points to the message candidate. Note that prior to execution of a retransmit request, regular completion must be performed for both channels, just to make sure that there are no pending completion operations.

Step 2: Selecting between two candidate messages (one belonging to each of the RequestOut and ResponseOut channels), a message carrying the segment to retransmit.

To select the message holding the segment to retransmit, RNIC compares Context[Ch #]::ReqOutNextToCompleteMsgSN with Context[Ch#]::RespOutNextToCompleteMsgSN. The smaller value belongs to the channel that holds a message with segment to retransmit.

FIG. 9 demonstrates two examples. In example A (ReqOut::NCSN=500, RespOut::NCSN=600), the selected message belongs to the RequestOut channel, i.e., message #5. In example B (ReqOut::NCSN=800, RespOut::NCSN=600), the selected message belongs to the ResponseOut channel, i.e., message #6.

Step 3: Finding the data buffer belonging to the message to start retransmit from.

This step, after message selection, determines the location of the Pointer descriptor referring to the beginning of the segment to retransmit. To find the Pointer descriptor, RNIC needs to calculate a starting sequence number of the message. Note that the starting SN of the message can be utilized to help find the buffer offset inside the message, and this offset can be used to find the buffer to retransmit from. The last sequence number of the message is known, and is kept in connection context (Context[Ch#]::ReqOutNextToCompleteMsgSN or Context[Ch#]::RespOutNextToCompleteMsgSN).

To calculate the starting sequence number of the message, RNIC compares the Context[Ch#]::ReqOutLastCompletedMsgSN with Context[Ch#]::RespOutLastCompletedMsgSN. The larger value indicates a starting sequence number of the message, more accurately, the starting sequence number of the message equals to max(Context [Ch#]::ReqOutLastCompletedMsgSN, Context[Ch#]::RespOutLastCompletedMsgSN)+1.

As shown in FIG. 9, in Example A, the starting sequence number is 401, and in Example B, the starting sequence number is 501. Once the starting sequence number of the message is found, RNIC walks through the Pointer Descriptors and looks for the Pointer Descriptor holding the beginning of the segment to retransmit. Note that generally, LastAckedSN indicates the beginning of the segment to retransmit.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embodied in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A hardware system for handling a completion process in a remote data memory access (RDMA) environment comprising:
    a RequestOut channel and a ResponseOut channel;
    a descriptor list for each channel, wherein each descriptor list includes a message descriptor for each message in the channel defining RequestOut and ResponseOut messages to an associated channel;
    an update mechanism for updating a message length field in the message descriptor with a sequence number of a last byte in the message whenever a channel swap occurs between the RequestOut channel and the ResponseOut channel;
    an acknowledgement (Ack) completion system that examines values in a completion context and compares a sequence number of a next to complete message with a last acknowledged sequence number to determine if the message should be completed, wherein the acknowledgement completion system includes a series of repeating logic steps that are separately applied to each of the RequestOut channel and the ResponseOut channel and include;
    concluding that the processing of the completion process is finished if the sequence number of the next to complete message is invalid;
    concluding that the processing of the completion process is finished if the sequence number of the next to complete message is greater than the last acknowledged sequence number;
    completing the message in the channel if the sequence number of the next to complete message is less than or equal to the last acknowledged sequence number, wherein completing the message in the channel includes updating the sequence number of the last completed message with the sequence number of the next to complete message; updating the sequence number of the next to complete message with a last sequence number of a next message in the channel performing completion of the operation if the completed message is not a read request message; and if the message is a read request message, waiting for reception and delivery of a read response to perform completion before performing completion, and then setting a pending read request bit in the completion context; and
    terminating the completion process in the RequestOut channel if the RequestOut channel is waiting for a completion of a read request; and
    a read request completion system that performs completion of a read request.

2. The hardware system of claim 1, wherein the read request completion system provides a second series of logic steps that include:
    completing any requests preceding the read request;
    completing the read request; and
    completing any requests following the read request;
    wherein the last two steps of the second set of logic steps are repeated a number of times equal to a value stored in the completion context that represents the number of completed read requests.

3. The hardware system of claim 2, further comprising a system for handling a retransmit request that includes a third series of logic steps for locating a segment to retransmit, wherein the steps include:
    performing a completion operation to ensure that there is no pending completion;
    identifying a candidate message for both the RequestOut channel and the ResponseOut channel;
    selecting a message carrying the segment to transmit from the two candidate messages; and
    determining a location of a pointer descriptor that refers to a beginning of the segment to retransmit, wherein the location of the pointer descriptor that refers to the beginning of the segment to retransmit is one more than the maximum of: the sequence number of the last completed message in the RequestOut channel; and the sequence number of the last completed message in the ResponseOut channel;
    wherein if the RequestOut channel is waiting for completion of a pending read request, the candidate message in the RequestOut channel comprises either a first not completed message in the RequestOut channel;
    wherein if the RequestOut channel is not waiting for completion of a pending read request, the candidate message in the RequestOut channel is given by a next-to-complete (N2C) pointer; and
    wherein the candidate message in the ResponseOut channel is given by a next-to-complete (N2C) pointer.

4. The hardware system of claim 2, wherein the message carrying the segment to transmit is the candidate message that resides in the channel having the lowest sequence number for the next to complete message.

5. A method for handling a completion process in a remote data memory access (RDMA) environment having a RequestOut channel and a ResponseOut channel, including performing an acknowledgement completion on each channel, with the steps of:
    concluding that the processing of the completion process is finished if the sequence number of a next to complete message is invalid;
    concluding tat the processing of the completion process is finished if the sequence number of the next to complete message is greater than the last acknowledged sequence number;

completing the message in the channel if the sequence number of the next to complete message is less than or equal to the last acknowledged sequence number, wherein the completing includes updating the sequence number of a last completed message with the sequence number of the next to complete message, updating the sequence number of the next to complete message with a last sequence number of a next message in the channel, and if the completed message is not a read request message, performing completion of the operation and if the message is a read request message, waiting for a read response to perform completion and setting a pending read request bit; and terminating the completion process in the RequestOut channel if the RequestOut channel is waiting for a completion of a read request.

6. The method of claim 5, further comprising a read request completion method that includes the steps of:

completing any requests preceding the read request;
completing the read request;
completing any requests following the read request; and
repeating the previous two steps a number of times equal to a value that represents the number of completed read requests.

7. method for locating a segment to retransmit for a retransmit request in a remote data memory access (RDMA) environment having a RequestOut channel and a ResponseOut channel, comprising:

performing a completion operation;

identifying a candidate message for both the RequestOut channel and the ResponseOut channel;

selecting a message carrying the segment to transmit from the two candidate messages; and determining a location of a pointer descriptor that refers to a beginning of the segment to retransmit, wherein the location of the pointer descriptor that refers to the beginning of the segment to retransmit is one more than the maximum of the sequence number of the last completed message in the RequestOut channel and the sequence number of the last completed message in the ResponseOut channel;

wherein if the RequestOut channel is waiting for completion of a pending read request, the candidate message in the RequestOut channel comprises a first not completed message in the RequestOut channel;

wherein if the RequestOut channel is not waiting for completion of a pending read request, the candidate message in the RequestOut channel is given by a next-to-complete (N2C) pointer; and wherein the candidate message in the ResponseOut channel is given by a next-to-complete (N2C) pointer.

* * * * *